United States Patent
Zhang et al.

(10) Patent No.: US 12,548,849 B2
(45) Date of Patent: Feb. 10, 2026

(54) METHOD FOR PRODUCING SEPARATOR FOR POWER STORAGE DEVICE

(71) Applicant: Asahi Kasei Battery Separator Corporation, Tokyo (JP)

(72) Inventors: Xun Zhang, Tokyo (JP); Hayato Matsuyama, Tokyo (JP); Tetsushi Nakao, Tokyo (JP)

(73) Assignee: Asahi Kasei Battery Separator Corporation, Tokyo (JP)

(*) Notice: Subject to any disclaimer, the term of this patent is extended or adjusted under 35 U.S.C. 154(b) by 835 days.

(21) Appl. No.: 17/630,242

(22) PCT Filed: Apr. 13, 2021

(86) PCT No.: PCT/JP2021/015360
§ 371 (c)(1),
(2) Date: Jan. 26, 2022

(87) PCT Pub. No.: WO2021/210590
PCT Pub. Date: Oct. 21, 2021

(65) Prior Publication Data
US 2022/0294076 A1    Sep. 15, 2022

(30) Foreign Application Priority Data

Apr. 13, 2020  (JP) .................................. 2020-071790

(51) Int. Cl.
*H01M 50/403*    (2021.01)
*H01M 10/0525*   (2010.01)
*H01M 50/417*    (2021.01)

(52) U.S. Cl.
CPC ..... *H01M 50/403* (2021.01); *H01M 10/0525* (2013.01); *H01M 50/417* (2021.01)

(58) Field of Classification Search
CPC ............. H01M 50/403; H01M 50/417; H01M 50/489; H01M 50/40; C08J 2323/06; C08J 2423/12; C08J 5/18; C08J 5/2231; C08J 9/26; C08J 2323/12; H01G 9/02; H01G 11/52; H01G 11/84
See application file for complete search history.

(56) References Cited

U.S. PATENT DOCUMENTS

| | | | |
|---|---|---|---|
| 6,094,337 A | 7/2000 | Ueda et al. | |
| 2009/0226813 A1 | 9/2009 | Takita et al. | |
| 2010/0248002 A1 | 9/2010 | Takita et al. | |
| 2011/0294016 A1* | 12/2011 | Tamura | H01M 50/417 429/251 |
| 2012/0115008 A1 | 5/2012 | Sano et al. | |
| 2012/0202104 A1 | 8/2012 | Han et al. | |
| 2013/0011743 A1* | 1/2013 | Yamada | C08J 5/18 521/143 |
| 2015/0274908 A1 | 10/2015 | Yanagishita et al. | |
| 2021/0074983 A1 | 3/2021 | Zhang et al. | |

FOREIGN PATENT DOCUMENTS

| | | |
|---|---|---|
| CN | 1198759 A | 11/1998 |
| CN | 101971390 A | 2/2011 |
| EP | 4050064 B1 | 3/2024 |
| JP | 2002-088189 A | 3/2002 |
| JP | 2002-105235 A | 4/2002 |
| JP | 2002-194132 A | 7/2002 |
| JP | 2002-226639 A | 8/2002 |
| JP | 2005-190792 A | 7/2005 |
| JP | 2006-016550 A | 1/2006 |
| JP | 2009-045775 A | 3/2009 |
| JP | 2009-114434 A | 5/2009 |
| JP | 2011-184671 A | 9/2011 |
| JP | 2012-164655 A | 8/2012 |
| JP | 2014-133873 A | 7/2014 |
| JP | 2020-092068 A | 6/2020 |
| WO | 2009/110396 A1 | 9/2009 |
| WO | 2011/118660 A1 | 9/2011 |
| WO | 2014/065331 A1 | 5/2014 |
| WO | 2020/067161 A1 | 4/2020 |

OTHER PUBLICATIONS

Zhang et al., WO 2020/067161 A1; WIPO machine translation, 2020 (Year: 2020).*
English translation of Written Opinion issued in corresponding PCT/JP2021/015360 dated Jun. 28, 2022.
Supplementary European Search Report issued in corresponding European Patent Application No. 21789362.7 dated Dec. 5, 2022.
Database WPI Week 200265 Thomson Scientific, London, GB; AN 2002-603404 XP002808074 (Jul. 10, 2002).
Extended European Search Report issued in European Patent Application No. 23182797.3 dated Oct. 12, 2023.
Extended European Search Report issued in European Patent Application No. 23182781.7 dated Oct. 12, 2023.
Winter et al., "Before Li Ion Batteries," Chemical Reviews, 118: 11433-11456 (2018).
Jerliu et al., "vol. Expansion during Lithiation of Amorphous Silicon Thin Film Electrodes Studied by In-Operando Neutron Reflectometry," Journal of Physical Chemistry C, 118: 9395-9399 (2014).
Zhu et al., "Si/a-C Nanocomposites with a Multiple Buffer Structure via One-Step Magnetron Sputtering for Ultrahigh- Stability Lithium-Ion Battery Anodes," ACS Applied Materials & Interfaces, 11, 45726-45736 (2019).

(Continued)

*Primary Examiner* — Adam A Arciero
(74) *Attorney, Agent, or Firm* — Morgan, Lewis & Bockius LLP

(57) ABSTRACT

Provided is a method for producing a separator for a power storage device, the method including: a step for extruding powdered polyethylene, pelletized polypropylene, and a plasticizer into a sheet form using an extruder to form a molded body; and a step for making the molded body porous by a wet method.

8 Claims, No Drawings

(56) References Cited

OTHER PUBLICATIONS

Wu, "Chain Structure and Entanglement," Journal of Polymer Science: Part B: Polymer Physics, 27: 723-741 (1989).
Wu, "Phase structure and adhesion in polymer blends: A criterion for rubber toughening," Polymer, 26: 1855-1863 (1985).
International Search Report issued in corresponding International Patent Application No. PCT/JP2021/015360 dated Jun. 29, 2021.
Office Action issued in European Patent Application No. 23182797.3 dated Jul. 10, 2025.

* cited by examiner

METHOD FOR PRODUCING SEPARATOR FOR POWER STORAGE DEVICE

FIELD

The present invention relates to a separator for a power storage device, and to a method for producing it.

BACKGROUND

Microporous films are widely used as microfiltration membranes, as fuel cell separators, as capacitor separators, as matrices for functional membranes that exhibit new functions by having functional materials packed into their pores, and as separators for power storage devices or their constituent materials.

Lithium ion secondary batteries (LIB) are widely used in laptop computers, cellular phones and digital cameras. Polyolefin microporous membranes are known as LIB separators or their constituent materials. PTL 1 proposes a method for producing a polyolefin microporous membrane designed to have high strength, high specific surface area and high pore volume. In PTL 1, a polyolefin microporous membrane is produced by melt kneading a polyolefin resin having a weight-average molecular weight of 500,000 or greater with a liquid paraffin, and extracting the liquid paraffin from the resulting resin composition. PTL 2 describes a method of producing a microporous membrane by first kneading and pelletizing a polyolefin resin such as polyethylene with a non-polyolefin resin (such as a polyamide) from an extruder, and then mixing the pellets with liquid paraffin and extrusion molding, and finally extracting the liquid paraffin. PTLs 3 to 5 describe methods for producing LIB separators that include conventional steps for producing a polyolefin microporous membrane.

Research has continued to progress in recent years for achieving higher capacities and high energy densities for LIBs, with a view toward longer distance traveling of electric vehicles. For example, NPL 1 teaches that LIB energy density can be vastly increased by increasing the nickel content in NMC metal oxide positive electrode materials, by adding silicon to graphite negative electrode materials, or completely replacing them with silicon.

NPL 2, on the other hand, teaches that (high-concentration) silicon negative electrodes undergo significant expansion and contraction in volume when lithium ions accumulate or are released during charge-discharge. In addition, NPL 3 states that voids repeatedly form around silicon particles upon expansion and contraction during charge-discharge of (high-concentration) silicon negative electrodes, and that accumulation of a solid electrolyte interface (SEI) in the voids leads to irreversible expansion of a (high-concentration) silicon negative electrode with long-term cycling use. According to these publications, since separator films undergo repetitive compressive force and release of force, the pore diameter structure of the films is destroyed (crushed) or irreversibly compressed, potentially resulting in lower ion permeability. Particularly in the latter case (the phenomenon described in NPL 3), it is difficult in principle to prevent formation of SEI in lithium ion batteries having nonaqueous electrolytic solutions with different compositions.

In NPL 4, Wu et al. report on the Kuhn chain, as a representative concept of the steric configuration of polymer chains. NPL 5 describes research on improving the dynamic properties of resin films utilizing mixed resins, wherein the sizes or inter-particle distances of heterogenous particles dispersed in the resin structure are controlled to improve the mechanical properties by means of a dispersion structure exceeding a specified degree of dispersion.

CITATION LIST

Patent Literature

[PTL 1] Japanese Unexamined Patent Publication No. 2002-088189
[PTL 2] Japanese Unexamined Patent Publication No. 2002-226639
[PTL 3] International Patent Publication No. 2020/067161
[PTL 4] Japanese Unexamined Patent Publication No. 2020-092068
[PTL 5] WO2011/118660

Non Patent Literature

[NPL 1] Chem. Rev. 2018, 118, 11433-11456
[NPL 2] J. Phys. Chem. C 2014, 118, 9395-9399
[NPL 3] ACS Appl. Mater. Interfaces 2019, 11, 45726-45736
[NPL 4] Journal of Polymer Science: Part B: Polymer Physics, Vol. 27, 723-741(1989)
[NPL 5] POLYMER, 1985, Vol 26, November 1855

SUMMARY

Technical Problem

In recent years it has been desired to reduce defects (i.e., amounts of unmelted materials) in the steps of mixing and extrusion of different materials during production of microporous membranes as structural materials of power storage device separators. Unmelted materials during the mixing and extrusion steps can cause aggregation or gelling in the resultant microporous membranes. Separators comprising microporous membranes with reduced defects are expected to allow realization of power storage devices with excellent capacity maintenance (cycle characteristics) after repeated charge-discharge.

However, the microporous membranes described in PTLs 1 and 2 are still in need of improvement in terms of defects during the material mixing and extrusion steps, and of the cycle characteristics of power storage devices implementing the separators. Furthermore, PTLs 3 to 5 do not specifically deal with the forms of the resin materials in the melt kneading step or extrusion step, and do not describe the effects that the types or structures of polyolefins in power storage device separators have on cycle characteristics.

In light of this situation, it is an object of the present invention to provide a separator for a power storage device with reduced defects in starting material mixing and extrusion steps, and excellent cycle characteristics.

Solution to Problem

The present inventors have studied a solution for the problem described above and have completed this invention upon finding that the problem can be solved by using a method for producing a separator for a power storage device having the following construction. Some of the aspects of the invention are as follows.

[1]
A method for producing a separator for a power storage device comprising the following steps:
  (1) a sheet casting step in which polypropylene, polyethylene and a plasticizer are extruded into a sheet using an extruder, cooled to solidification, and processed into a cast sheet;
  (2) a stretching step in which the cast sheet is stretched to an area increase factor of 20 to 250 to form a stretched sheet;
  (3) a microporous membrane forming step in which the plasticizer is extracted from the stretched sheet to form a microporous membrane;
  (4) a heat treatment step in which the microporous membrane is subjected to heat treatment, and stretching and relaxation in the transverse direction to obtain a heat treated microporous membrane; and
  (5) a winding step in which the heat treated microporous membrane is wound up,
  wherein the polyethylene is in powder form and the polypropylene is in pellet form.

[2]
The method for producing a separator for a power storage device according to [1] above, wherein:
  the polypropylene and polyethylene are loaded into the extruder by any one of the following methods (a) to (c):
  (a) a method of loading the polypropylene and polyethylene into the extruder using separate feeders;
  (b) a method of loading the polypropylene and polyethylene into the extruder in a dry blended state using one feeder; or
  (c) a method of loading a plurality of resin materials obtained by dry blending the polypropylene and polyethylene, into the extruder using separate feeders.

[3]
The method for producing a separator for a power storage device according to [1] or [2], wherein the polyethylene/polypropylene weight ratio is 99/1 to 60/40.

[4]
The method for producing a separator for a power storage device according to [3] above, wherein the polyethylene has a weight-average molecular weight (Mw) of 100,000 to 9,700,000, and the ratio (Mw/Mn) of the weight-average molecular weight (Mw) to number-average molecular weight (Mn) is 3 to 12.

[5]
The method for producing a separator for a power storage device according to [3] above, wherein the polypropylene has a weight-average molecular weight (Mw) of 300,000 to 2,000,000, the ratio (Mw/Mn) of the weight-average molecular weight (Mw) to number-average molecular weight (Mn) is 3 to 12, and the isotactic pentad fraction (mmmm) of the polypropylene is 85.0 mol % to 99.7 mol %.

[6]
A separator for a power storage device produced by the production method according to any one of [1] to [5] above.

[7]
The separator for a power storage device according to [6] above, wherein:
  the separator for a power storage device comprises a microporous membrane,
  the microporous membrane comprises polyethylene and polypropylene, and
  in X-ray diffraction (XRD) or wide-angle X-ray scattering (WAXS) analysis of the microporous membrane, the crystallite size of the polyethylene is 15 nm to 40 nm and the crystallite size of the polypropylene is 10 nm to 50 nm.

[8]
A separator for a power storage device comprising a microporous membrane, wherein:
  the microporous membrane comprises polyethylene and polypropylene, and
  in X-ray diffraction (XRD) analysis of the microporous membrane, the crystallite size of the polyethylene is 15 nm to 40 nm and the crystallite size of the polypropylene is 10 nm to 50 nm.

[9]
The separator for a power storage device according to [8] above, wherein in the XRD analysis of the microporous membrane, the degree of crystallinity of the polyethylene is 55% to 99.9%.

[10]
A separator for a power storage device comprising a microporous membrane, wherein:
  the microporous membrane comprises polyethylene and polypropylene, and
  in wide-angle X-ray scattering (WAXS) analysis of the microporous membrane, the crystallite size of the polyethylene is 15 nm to 40 nm and the crystallite size of the polypropylene is 10 nm to 50 nm.

[11]
The separator for a power storage device according to [10] above, wherein in the WAXS analysis of the microporous membrane, the degree of crystallinity of the polyethylene is 50% to 90%.

[12]
The separator for a power storage device according to any one of [8] to [11] above, wherein the isotactic pentad fraction (mmmm) of the polypropylene in the microporous membrane is 85.0 mol % to 99.7 mol %.

[13]
A battery comprising the separator for a power storage device according to any one of [6] to [12] above.

Advantageous Effects of Invention

According to the invention it is possible to provide a method for producing a microporous membrane or a separator for a power storage device, having reduced defects in the starting material mixing and extrusion steps. According to the invention it is also possible to provide a power storage device having a reduced aggregation amount or gel content in the separator for a power storage device obtained by the production method, and excellent cycle characteristics.

DESCRIPTION OF EMBODIMENTS

Embodiments of the invention will now be described, with the implicit understanding that the invention is not limited only to the embodiments and may incorporate various modifications without falling outside of the scope of its gist. Throughout the present specification, value ranges separated by the preposition "to", unless otherwise specified, are ranges where the two numerical values are the upper and lower bounds. The upper limits and lower limits for the numerical ranges throughout the present specification may also be combined as desired.

The first embodiment of the invention provides a separator for a power storage device comprising a microporous membrane, and it specifies the crystalline structures of the resin components of the microporous membrane. The second embodiment of the invention provides a method for producing a separator for a power storage device comprising a microporous membrane, and it specifies the starting materials used in the production method. Each embodiment will now be described.

<Separator for Power Storage Device>

One aspect of the invention provides a separator for a power storage device. A "separator for a power storage device" (hereunder also referred to simply as "separator") is a member disposed between a plurality of electrodes in a power storage device, and having ion permeability and optionally a shutdown property.

The separator may be in the form of a flat membrane (formed by a single microporous membrane, for example), a laminated film (for example, a laminated stack of a plurality of microporous membranes or a laminated stack of a microporous membrane and another film), or a coating film (when at least one side of the microporous membrane is coated with a functional substance).

The separator of the first embodiment is provided with a microporous membrane comprising polyethylene (PE) having a crystallite size of 15 nm to 40 nm and polypropylene (PP) having a crystallite size of 10 nm to 50 nm. The crystallite sizes can be measured by a known method, by X-ray diffraction (XRD) using an Ultima-IV reflective X-ray diffraction apparatus by Rigaku Corp. or by wide-angle X-ray scattering (WAXS) using a NANOPIX transmission X-ray scattering apparatus. The constituent elements of the separator will now be described.

<Microporous Membrane>

The microporous membrane can be utilized as a microfiltration membrane, a fuel cell separator, a capacitor separator, a separator for a power storage device, an electrolysis membrane, or a structural material of the same.

When a microporous membrane is to be used as a separator for a power storage device or its structural material, and especially as a LIB separator or its structural material, the microporous membrane itself may be used as the separator, or another layer or other membrane may be provided on at least one side of the microporous membrane for combined used as the separator. A microporous membrane to be used as a separator for a power storage device preferably has low electron conductivity but exhibits ionic conductivity, has high resistance to organic solvents, and has a fine pore diameter.

From the viewpoint of the shutdown property when used as a separator for a power storage device, the microporous membrane is preferably formed by 50 weight % or more and 100 weight % or less of a polyolefin (PO), the PO percentage being more preferably 60 weight % or more and 100 weight % or less and even more preferably 70 weight % or more and 100 weight % or less. From the viewpoint of thermal rupture resistance and lower pore diameter, the microporous membrane preferably comprises both polyethylene (PE) and polypropylene (PP) as PO.

That the microporous membrane of the first embodiment comprises PE having a crystallite size of 15 nm to 40 nm and PP having a crystallite size of 10 nm to 50 nm means that the microporous membrane formed has the PE and PP crystalline states well distributed.

A microporous membrane having PE and PP well distributed also has better volume recovery in the compression direction due to swelling of the electrolyte solution, which includes easier deformation in response to expansion and contraction of negative electrodes such as silicon-containing negative electrodes, compared to a separator for a conventional (high-concentration) silicon negative electrode as described in NPLs 1 to 3 (in other words, it has easier recovery even with reduced pore diameter of the microporous membrane), and/or the separator closely bonds with the negative electrode during shrinkage in a silicon-containing negative electrode thus helping to prevent voids in both, while excessive deposited growth of solid electrolyte interface (SEI) on the negative electrode surface also tends to be inhibited, thus improving cycling during prolonged use in a power storage device. A suitable crystal distribution of PE and PP suggests reduced defects in the resin material mixing and extrusion steps of the production process for the microporous membrane. From this standpoint, the preferred combination of the crystallite sizes of PE and PP is a PE crystallite size of 16 nm to 39 nm and a PP crystallite size of 11 nm to 49 nm, and more preferably a PE crystallite size of 20 nm to 38 nm and a PP crystallite size of 11 nm to 47 nm.

A suitable crystal distribution of PE and PP in the microporous membrane can be obtained, for example, by specifying the states of the PE and PP in the resin material mixing and extrusion steps, or by controlling the stereoregular structure such as the isotactic pentad fraction (mmmm).

(Polyethylene (PE))

The polyethylene (PE) preferably has a weight-average molecular weight (Mw) of 100,000 to 9,700,000, and/or a ratio (Mw/Mn) of the weight-average molecular weight (Mw) to number-average molecular weight (Mn) of 3 to 12. A PE resin with the Mw and Mw/Mn is known as ultrahigh molecular weight polyethylene (UHMWPE) and is preferred from the viewpoint of crystal distribution optimization, aggregation amount and gel content of the microporous membrane comprising the PE and PP, and of the cycle characteristics of the separator and power storage device using it.

From the same viewpoint, the Mw of the PE is more preferably 120,000 to 9,000,000 and even more preferably 200,000 to 8,500,000. The degree of dispersion (Mw/Mn) is more preferably 4 to 11 and even more preferably 5 to 10.

From the viewpoint of a swelled state due to the swelled state of the electrolyte solution in the battery, PE alone has a degree of crystallinity of preferably 55% to 99.9%, more preferably 80% to 99.8% and even more preferably 85% to 97%, as measured by XRD. From the same viewpoint, PE alone has a degree of crystallinity of preferably 50% to 90%, more preferably 65% to 80% and even more preferably 68% to 77%, as measured by WAXS. The XRD and WAXS methods give different measurement results for crystallite sizes and degree of crystallinity even when measuring the same microporous membrane, with notable differences often being seen in measurement of the degree of crystallinity. The reason for such differences is assumed to be as follows. XRD is reflective measurement and gives measurement results pertaining primarily to the surface of a microporous membrane. WAXS, on the other hand is transmissive measurement and gives measurement results as averages pertaining to the surface and internal structure of a microporous membrane. Since the microporous membrane described in the present specification is subjected to cooling and heating procedures from the surface, sheet formation, and stretching during the production steps, the resulting microporous membrane may tend to have a surface with more progressed crystallization.

In the overall higher-order structure throughout the crystals of the PE crystal group, the electrolyte solution tends to swell (by permeation and internal diffusion) as a result of thermal energy such as molecular vibration in the operating temperature range of the battery (−30° C. to 80° C.), and this is presumably responsible for a satisfactory volume recovery rate in the compression direction. Swelling in the PE crystalline structure is a phenomenon that occurs when the permeating force of the electrolyte solution is greater than force due to entropy elastic energy of the higher-order structure of the PE. Therefore, swelling in the PE higher-order structure requires either increase in the permeating force of the electrolyte solution, or assembly of a higher-order structure of PE in which the electrolyte solution more easily swells (a higher-order structure of PE in which the overall higher-order structural heat is capable of thermal energy stabilization, after swelling). According to the invention it has become possible to construct a higher-order structure of PE that easily swells, while maintaining the mechanical strength of the microporous membrane in the operating temperature range of the battery. With this in mind, the PE crystallite size is preferably 15 nm to 40 nm, more preferably 16 nm to 39 nm and even more preferably 20 nm to 38 nm. The crystallite size of PE alone can be adjusted to within the aforementioned numerical range by, for example, controlling the PE form or the method of loading the PE starting material during the microporous membrane production process, or by specifying the ratio of the PE starting material with respect to the polypropylene (PP) starting material.

The PE may consist of a single type alone, or it may include multiple types of UHMWPE. From the viewpoint of high strength as a microporous membrane, the UHMWPE is preferably a poly(ethylene and/or propylene-co-α-olefin), and more preferably one or more selected from the group consisting of poly(ethylene-co-propylene), poly(ethylene-co-butene) and poly(ethylene-co-propylene-co-butene). From the same viewpoint, the UHMWPE preferably includes an ethylene-derived structural unit at 98.5 mol % or more and 100 mol % or less, and more preferably it includes a structural unit derived from an α-olefin other than ethylene at greater than 0.0 mol % and 1.5 mol % or less.

The PE may also include a polyethylene resin other than UHMWPE. Examples of polyethylene resins other than UHMWPE include low-density polyolefin (LDPE) such as linear low-density polyethylene (LLDPE), and high-density polyethylene (HDPE), high-pressure method low-density polyethylene, or mixtures of the same.

(Polypropylene (PP))

The polypropylene (PP) preferably has a weight-average molecular weight (Mw) of 300,000 to 2,000,000, and a ratio (Mw/Mn) of the weight-average molecular weight (Mw) to number-average molecular weight (Mn) of 3 to 12. A PP resin with the Mw and Mw/Mn is preferred from the viewpoint of crystal distribution optimization, aggregation amount and gel content of the microporous membrane comprising the PE and PP, and of the cycle characteristics of the separator and power storage device using it.

From the same viewpoint, the Mw of the PP is more preferably 305,000 to 1,900,000 and even more preferably 310,000 to 1,800,000. The degree of dispersion (Mw/Mn) is more preferably 4 to 11 and even more preferably 4.5 to 10.

From the viewpoint of satisfactory volume recovery of the microporous membrane comprising PE and PP in the compression direction due to swelling of the electrolyte solution in the battery, the crystallite size of PP alone is preferably 10 nm to 50 nm, more preferably 11 nm to 49 nm and even more preferably 11 nm to 47 nm. PP is non-compatible with PE and therefore does not form mixed crystals with PE, resulting in a structure that is a combined crystal system with PE microdispersed in a network structure. As indicated in NPL 5, a dispersed resin structure having a degree of dispersion that exceeds a specified level, by control of the sizes or interparticle distances of different particles dispersed in the structure, will sometimes exhibit remarkable increase in mechanical properties such as impact strength, and this phenomenon is known to be controllable to several hundreds of nm to several μm for dispersed particles of different types. As with this embodiment, however, it has been surprisingly found that the mechanical property of volume recovery in the compression direction of a separator can be improved to a significantly smaller order of several tens of nm, by controlling not the particles but rather the crystalline structure of PE and PP to a previously unknown structure. The crystallite size of PP alone can be adjusted to within the aforementioned numerical range by, for example, controlling the PP form or the method of loading the PP starting material during the microporous membrane production process, or by specifying the ratio of PP starting material with respect to the polyethylene (PE) starting material.

From the viewpoint of heat resistance and melt viscosity, the PP is preferably propylene homopolymer. Examples of PP include isotactic polypropylene, syndiotactic polypropylene and atactic polypropylene. Isotactic polypropylene is preferred among these. The amount of isotactic PP is preferably 90 weight % or greater, more preferably 95 weight % or greater, even more preferably 98 weight % or greater and yet more preferably 100 weight % (all), with respect to the total weight of PP in the microporous membrane.

From the viewpoint of optimizing the crystal distribution of PE and PP in the microporous membrane, the isotactic pentad fraction (mmmm), related to the stereoregular structure (pentad sequence) of PP, is preferably 85.0 mol % to 99.7 mol %, more preferably 86.0 mol % to 99.6 mol % and even more preferably 87.0 mol % to 99.5 mol %.

From the viewpoint of optimizing the crystal distribution of PE and PP in the microporous membrane, (mmmr) in the PP pentad sequence is preferably 0.5 mol % to 2.5 mol % and more preferably 0.9 mol % to 2.4 mol %.

From the same viewpoint, (rmmr) in the PP pentad sequence is preferably 0.1 mol % to 1.0 mol % and more preferably 0.1 mol % to 0.6 mol %.

From the same viewpoint, (mmrr) in the PP pentad sequence is preferably 0.3 mol % to 2.5 mol % and more preferably 0.5 mol % to 2.3 mol %.

From the same viewpoint, (mmrm+rrmr) in the PP pentad sequence is preferably 0.5 mol % to 1.5 mol % and more preferably 0.7 mol % to 1.3 mol %.

From the same viewpoint, (mrmr) in the PP pentad sequence is preferably 0.5 mol % or less and more preferably 0.4 mol % or less.

From the same viewpoint, (rrrr) in the PP pentad sequence is preferably 0.1 mol % to 1.5 mol % and more preferably 0.2 mol % to 1.2 mol %.

From the same viewpoint, (rrrm) in the PP pentad sequence is preferably 0.1 mol % to 1.5 mol % and more preferably 0.2 mol % to 1.0 mol %.

From the same viewpoint, (mrrm) in the PP pentad sequence is preferably 0.1 mol % to 1.5 mol % and more preferably 0.2 mol % to 1.0 mol %.

A structure in which the methyl groups in the polypropylene units are linked in a codirectional manner is known as "meso" (m), and a structure in which they are linked in an opposite-directional manner is known as "racemo" (r). With this embodiment, a phenomenon of excellent adjustment of the PE crystal distribution was seen in production of a microporous membrane using PP formed with a configuration of one or more among mmmm to mrrm.

For this phenomenon it is important for the dissolved PE and PP to be in a well-dispersed state on the molecular level under conditions with the copresence of a plasticizer, and control of the entangled state of the PP molecular chains is especially desirable. As reported by Wu et al. in NPL 4, the Kuhn chain model is a representative concept of the steric configuration of polymer chains, wherein some of the units of the monomer are bent, defining a conformation for the polymer chains. In the Kuhn chain model, a "node" represents an atom between bonds, which is a C atom in the case of PP, while "$l_k$" is the bond length, which is the distance between C atoms in the case of PP. A theoretical formula has been derived following this model, to determine the three-dimensional angle between segments and to calculate the distance between both ends of the polymer chains, allowing the entangled structure of the molecular chains to be logically described. For this embodiment, the ratio of mmmm configuration in PP has been experimentally established, and such PP is conjectured to have a radius of rotation that allows satisfactory dispersibility with PE in plasticizers.

(Weight Ratio of PE and PP)

The weight ratio of polyethylene and polypropylene is preferably 99/1 to 60/40, more preferably 97/3 to 70/30, even more preferably 95/5 to 85/15 and yet more preferably 93/7 to 90/10, as the PE/PP weight ratio. If the PE/PP weight ratio in a microporous membrane is adjusted to within the numerical range specified above, then presumably the PP has been uniformly dispersed in the PE. In actuality it is difficult to uniformly disperse PP in PE simply by mixing a PE starting material with a PP starting material during the production process for a microporous membrane. With no intention to be limited to any particular theory, the aforementioned suitable dispersion tends to be obtainable when the forms or the methods of loading the PE starting material and PP starting material are controlled and they are supplied to a special extrusion step in the production process for a separator for a power storage device described below. By this method, PP is more easily dispersed in PE and more suitably in the weight ratio specified above.

(Other Contents)

The microporous membrane may also comprise a polyolefin (PO) resin other than PE and PP, such as a butylene homopolymer with excellent crystallinity, in a range that does not interfere with the function and effect exhibited by the invention.

As resin components other than PO, the microporous membrane may also comprise, for example, polyamide resins such as nylon 6, nylon 66, nylon 11, nylon 6-10, nylon 6-12, nylon 6-66 and aramid resins; polyimide-based resins; polyester-based resins such as polyethylene terephthalate (PET) and polybutene terephthalate (PBT); fluorine-based resins such as polyvinylidene fluoride (PVDF) and polytetrafluoroethylene (PTFE); copolymers of ethylene and vinyl alcohol (for example, EVAL by Kuraray Co., Ltd., melting point: 157° C. to 190° C.), or polysulfone, polyethersulfone, polyketone or polyether ether ketone (PEEK), in ranges that do not interfere with the function and effect exhibited by the invention. These resin components may be used alone or as multiple components.

The microporous membrane may also comprise additives other than resins, in ranges that do not interfere with the function and effect exhibited by the invention. Examples of additives include dehydrating condensation catalysts, metal soaps such as calcium stearate or zinc stearate, ultraviolet absorbers, light stabilizers, antistatic agents, anti-fogging agents and color pigments.

(Properties of Microporous Membrane)

The properties of the microporous membrane will now be described. These properties are those of a microporous membrane for a separator for a power storage device that is in a flat membrane form, but a separator for a power storage device that is in a laminated film form can also be measured after removing the layers other than the microporous membrane from the laminated film.

The porosity of the microporous membrane is also preferably 20% or higher, more preferably 30% or higher and even more preferably 32% or higher or 35% or higher. If the porosity of the microporous membrane is 20% or higher, then when the microporous membrane has been used in an alkali metal ion battery separator or its structural material, the property of following rapid movement of alkali metal ions will tend to be further improved. The porosity of the microporous membrane is also preferably 90% or lower, more preferably 80% or lower and even more preferably 50% or lower. If the porosity of the microporous membrane is 90% or lower, then the film strength will be further increased and self-discharge will tend to be inhibited. The porosity of the microporous membrane is measured by the method described in the Examples.

The air permeability of the microporous membrane is preferably 1 second or longer, more preferably 50 seconds or longer, even more preferably 55 seconds or longer and yet more preferably 100 seconds or longer, per 100 cm$^3$. If the air permeability of the microporous membrane is 1 second or longer, the balance between the membrane thickness, porosity and mean pore size will tend to be improved. The air permeability of the microporous membrane is also preferably 400 seconds or less and more preferably 300 seconds or less. A microporous membrane air permeability of 400 seconds or less will tend to result in increased ion permeability. The air permeability of the microporous membrane can be adjusted by adjustment of the stretch ratio and stretching temperature, for example. The air permeability is measured by the methods described in the Examples.

The membrane thickness of the microporous membrane is preferably 1.0 µm or greater, more preferably 2.0 µm or greater and even more preferably 3.0 µm or greater or 4.0 µm or greater. A microporous membrane thickness of 1.0 µm or greater will tend to result in increased film strength. The membrane thickness of the microporous membrane is also preferably 500 µm or smaller, more preferably 100 µm or smaller and more preferably 80 µm or smaller, 22 µm or smaller or 19 µm or smaller. A microporous membrane thickness of 500 µm or smaller will tend to result in increased ion permeability. The membrane thickness of the microporous membrane can be adjusted by adjustment of the stretch ratio and stretching temperature, for example. The membrane thickness is also measured by the methods described in the Examples.

Particularly for use of the microporous membrane as a LIB separator or its structural material, the membrane thickness of the microporous membrane is preferably 25 µm or smaller, more preferably 22 µm or smaller or 20 µm or smaller, and even more preferably 18 µm or smaller. In this case, a microporous membrane thickness of 25 µm or smaller will tend to result in increased permeability. The lower limit for the microporous membrane thickness may be 1.0 µm or greater, 3.0 µm or greater, 4.0 µm or greater or 5.0 µm or greater.

<Method for Producing Separator for Power Storage Device>

Another aspect of the invention provides a method for producing a separator for a power storage device comprising a microporous membrane. The method for producing a separator for a power storage device according to the second embodiment may include a method for producing a microporous membrane, and it comprises the following steps:

(1) a sheet casting step in which polypropylene (PP) in pellet form, polyethylene (PE) in powder form and a plasticizer are extruded into a sheet using an extruder, cooled to solidification, and processed into a cast sheet;

(2) a stretching step in which the cast sheet is biaxially stretched to an area increase factor of 20 to 250 to form a stretched sheet;

(3) a microporous membrane forming step in which the plasticizer is extracted from the stretched sheet to form a microporous membrane;

(4) a heat treatment step in which the microporous membrane is subjected to heat treatment, and stretching and relaxation in the transverse direction (TD) to obtain a heat treated microporous membrane; and (5) a winding step in which the heat treated microporous membrane is wound up.

The method for producing a separator for a power storage device of the second embodiment can reduce defects (i.e., the amount of unmelted materials) in mixing and extrusion steps of multiple starting materials, by mixing and extruding a PE starting material in powder form and a PP starting material in pellet form, to form a membrane. Unmelted materials in the mixing and extrusion steps can lead to aggregates and gelling in the final obtained microporous membrane or separator comprising it, and therefore a separator provided with a microporous membrane having reduced defects can help to achieve thickness-maintaining properties (cycle characteristics) of the separator or the capacity-maintaining properties (cycle characteristics) of the power storage device, with repeated charge-discharge.

According to the second embodiment it is possible to not only to obtain a separator of the first embodiment as explained above, but also to optimize the crystal distribution of PE and PP in the microporous membrane forming the separator, as explained above, and for example, to more easily respond to the deformation of expansion and contraction by a negative electrode such as a silicon-containing negative electrode, thus contributing to adhesiveness between the negative electrode and separator.

The resin materials and additives used for the second embodiment may be the same as the PE, PP and PO, as well as the other resins and additives, as explained for the first embodiment. A separator for a power storage device produced by the production method of the second embodiment, similar to the separator for a power storage device of the first embodiment, is also preferably provided with a microporous membrane comprising PE having a crystallite size of 15 nm to 40 nm and PP having a crystallite size of 10 nm to 50 nm, and more preferably the isotactic pentad fraction (mmmm) for the stereoregular structure of PP is 85.0 mol % to 99.7 mol %. The steps for the second embodiment will now be explained in order.

[Sheet Casting Step (1)]

In step (1), PP starting material pellets, a PE starting material powder and a plasticizer are supplied to an extruder. The PE starting material and PP starting material may be used with a predetermined weight ratio of PE and PP as explained for the first embodiment.

(Polyethylene (PE) Starting Material)

From the viewpoint of increasing the yield in the starting material mixing and extrusion steps of the production process for the microporous membrane, and from the viewpoint of facilitating reduction in the amount of unmelted materials in the microporous membrane that is obtained, the PE starting material is preferably in the form of powder, and more preferably 2 weight % to 100 weight % of the total weight of PE used is powder.

A preferred "powder" as the PE starting material satisfies at least one of the conditions selected from the group consisting of having a number-mean particle size ($Nd_{50}$) of 80 µm to 180 µm, a volume-average particle diameter ($Vd_{50}$) of 120 µm to 220 µm, a number particle size distribution ($Nd_{80}/Nd_{20}$) of 1.1 to 4.2 and preferably 1.2 to 4.1, a volume particle size distribution ($Vd_{80}/Vd_{20}$) of 1.1 to 3.3 and preferably 1.15 to 3.2, a crystallite size in the range of 15 nm to 40 nm, a degree of crystallinity of 30% to 99%, preferably 32% to 98% and more preferably 38% to 97.5%, and comprising polyethylene. The number-mean particle size ($Nd_{50}$), volume-average particle diameter ($Vd_{50}$), number particle size distribution ($Nd_{80}/Nd_{20}$), volume particle size distribution ($Vd_{80}/Vd_{20}$), crystallite size and degree of crystallinity can be measured by known methods.

For example, the number-mean particle size ($Nd_{50}$), volume-average particle diameter ($Vd_{50}$), number particle size distribution ($Nd_{80}/Nd_{20}$) and volume particle size distribution ($Vd_{80}/Vd_{20}$) can be obtained by measurement using a Particle Insight flow image analysis particle size/profile analyzer by Micromeritics. The crystallite size and degree of crystallinity, for example, can be obtained by XRD measurement using an Ultima-IV X-ray diffraction analyzer by Rigaku Corp.

(Polypropylene (PP) Starting Material)

From the viewpoint of increasing the yield in the starting material mixing and extrusion steps of the production process for the microporous membrane, and from the viewpoint of facilitating reduction in the amount of unmelted materials in the microporous membrane that is obtained, the PP starting material is preferably in the form of pellets, and more preferably 2 weight % to 100 weight % of the total weight of PP used is pellets.

PP pellets can be obtained, for example, by drying the polymerized PP powder, and then extruding it into a strand using an extruder, water-cooling it, and cutting the strand into pellets. In this case the viscosity-average molecular weight (Mv) of the PP powder starting material is preferably 200,000 or more and 1,000,000 or less, more preferably 250,000 or more and 900,000 or less, and even more preferably 300,000 or more and 800,000 or less. The Mv of PP can be calculated by the following formula, with measurement of the limiting viscosity [η] (dl/g) at 135° C. in a decalin solvent, according to ASTM-D4020.

$$[\eta]=1.10\times10^{-4} Mv^{0.80}$$

The preferred "pellets" as the PP starting material are of a resin having a larger number-mean particle size ($Nd_{50}$) and volume-average particle diameter ($Vd_{50}$) than the preferred "powder" for the PE starting material, and with single side lengths of 1 mm or greater with a maximum of 10 mm or less. The shapes of the pellets are not particularly restricted and may be spherical, elliptical-spherical or columnar. They can be obtained by melt extrusion of the starting material by an extruder and water-cooling or air-cooling while forming a strand, with continuous cutting. The dimensions and detailed shapes of the pellets can be adjusted by the manner of strand formation and the cutting method, for example.

(Combination PE Starting Material Powder and PP Starting Material Pellets)

By preparing the PP starting material in the form of "pellets", it is possible to drastically slow the swelling speed by the plasticizer (that is, the PP pellets are assumed to essentially not swell). It is important not to inhibit swelling of the PE starting material powder inside the extruder. From the viewpoint of uniform melting in the melting step following the swelling step, the preferred "pellets" for the PP starting material component have a larger crystallite size than the preferred "powder" for the PE starting material component, and have the PP crystallite size explained for the first embodiment.

In the method for producing pellets, the pellet crystallite sizes, the degree of crystallinity and the pellet sizes and shapes can be adjusted by changing the temperature of the resin extruded into a strand form or the cooling temperature during cutting, or the drawing speed of the strand by extrusion (molten microstretching). The number-mean particle size ($Nd_{50}$), volume-average particle diameter ($Vd_{50}$), crystallite size and degree of crystallinity can be measured by known methods. For example, the number-mean particle size ($Nd_{50}$), volume-average particle diameter ($Vd_{50}$), crystallite size and degree of crystallinity can be measured by the methods used for the first embodiment. The pellet sizes can be obtained by measurement of their single-side lengths using a calibrated caliper, for example.

A mixture of PP pellets and PE powder can notably improve the uniformity of swelling of the plasticizer in the extruder. This is thought to be because the swelling speed of pellets is significantly slower than powder. The PP pellets are therefore suitable for use in the subsequent melting and kneading without excessively inhibiting swelling of the PE powder, and basically without swelling of the pellets themselves. This also helps to easily disperse the component PP in the component PE in a uniform manner on the molecular level, even in the melt kneading process.

(Plasticizer)

The plasticizer may be any known material that is liquid at temperatures of 20° C. to 70° C. and has excellent dispersibility for PE or PP. In consideration of subsequent extraction as well, the plasticizer used in step (1) is preferably a non-volatile solvent that can form a homogeneous solution at or above the melting point of PE or PP. Specific examples of such non-volatile solvents include hydrocarbons such as liquid paraffin, paraffin wax, decane and decalin; esters such as dioctyl phthalate and dibutyl phthalate; and higher alcohols such as oleyl alcohol and stearyl alcohol. Liquid paraffins are preferred among these because of their high compatibility with polyethylene and low risk of interfacial peeling between the resin and plasticizer even when the melt kneaded mixture is stretched, tending to allow homogeneous stretching.

(Supply of Starting Materials to Extruder)

The extruder may be a single-screw extruder, twin-screw extruder or screw-equipped short axis extruder, for example, with a twin-screw extruder being preferred. The starting materials are also preferably subjected to shear with a continuous mixer in step (1), and more preferably a continuous mixer is mounted on the twin-screw extruder.

The resin material and/or plasticizer are supplied to the extruder at a temperature of preferably 25° C. to 80° C., more preferably 30° C. to 76° C. and even more preferably 30° C. to 70° C., from the viewpoint of ensuring suitable viscosity while also ensuring entanglement of the polymer chains to an extent that does not lower the molecular weight of the resin material.

From the viewpoint of controlling the crystalline structures of the PE and PP, and controlling swelling with respect to the plasticizer, the PE and PP starting materials are preferably loaded into the extruder by any one of the following methods (a) to (c):

(a) a method of loading the PP pellets and PE powder into the extruder using separate feeders;
(b) a method of loading the PP pellets and PE powder into the extruder in a dry blended state using one feeder; or
(c) a method of obtaining a plurality of resin materials by dry blending the PP pellets and PE powder, and loading the plurality of resin materials into the extruder using separate feeders.

Since control of the crystalline structure of PE and PP is important when the PE and PP are in the mixed state, the invention makes use of the thermodynamic semi-phase soluble properties of both to control the dispersed state of the PE and PP during the residence time in the extruder. The sizes of the loaded PE and PP (such as powder or pellets) were controlled from this viewpoint to indirectly control the crystalline structure of PE and PP. In addition, before the PE melts in the extrusion, swelling of the plasticizer such as liquid paraffin (LP) is most important for homogeneous dispersion of the PE itself (without forming unmelted material or a gel, for example). It has been experimentally shown that excessive molten PP mixes with LP and increases the viscosity or non-homogeneity of the plasticizer, thereby inhibiting homogeneous swelling of the PE. From this viewpoint, the PE and PP starting materials are preferably loaded into the extruder by any one of the aforementioned methods (a) to (c).

In loading method (a), the timing of loading of the PP and PE into the extruder may be simultaneous, successive or continuous, but simultaneous supply to a twin-screw extruder is preferred. In loading methods (b) and (c), the timing of loading of the PP and PE into the extruder is simultaneous.

In loading method (c), dry blending of the PP pellets and PE powder may be carried out multiple times to obtain a plurality of resin materials, or a plurality of resin materials may be obtained by dividing a dry blend obtained by a single dry blending of the PP pellets and PE powder.

Of the starting material loading methods (a) to (c), (a) and (b) are more preferred and (b) is even more preferred, from the viewpoint of separator thickness retention and/or cell capacity retention after cycle testing, by constructing a homogeneous dispersed state of PE and PP for stability control during extrusion.

The plasticizer can be supplied to the twin-screw extruder together with the PE starting material and/or PP starting material. After the plasticizer has been supplied to the twin-screw extruder together with the PE starting material and/or PP starting material, additional plasticizer may also be supplied through the same or a different feeder. This type of twin-screw extruder generally has a top feed port situated at the upstream end and a middle feed port situated at the downstream end from the top feed port and within the melt kneading area. After the mixed slurry has been supplied through the top feed port of the twin-screw extruder, therefore, additional plasticizer can be supplied through the middle feed port ahead of the twin-screw extruder. This can facilitate adjustment of the liquid paraffin quantity ratio in the resin composition extruded from the twin-screw extruder to the desired proportion, and can also facilitate adjustment of the temperature of the resin composition to the desired range. A first component or second component can also naturally be supplied from the middle feed port.

The mixed slurry may be prepared using a continuous mixer. From the viewpoint of causing maximal swelling of the PE starting material and plasticizer, the lower limit for the preset temperature of the continuous mixer is preferably 25° C. or higher and more preferably 30° C. or higher, and from the viewpoint of melting the resin materials during mixing, the upper limit is preferably 68° C. or lower, and more preferably 67° C. or lower, 66° C. or lower or 65° C. or lower.

From the viewpoint of uniformly contacting the resin materials with the plasticizer to obtain a dispersion, the shear rate of the continuous mixer is 100 seconds$^{-1}$ to 400,000 seconds$^{-1}$, preferably 120 seconds$^{-1}$ to 398,000 seconds$^{-1}$ and more preferably 1,000 seconds$^{-1}$ to 100,000 seconds$^{-1}$.

From the viewpoint of ensuring dispersion of the resin material in the plasticizer, the residence time in the continuous mixer is 1.0 seconds to 60 seconds, preferably 2.0 seconds to 58 seconds and more preferably 2.0 seconds to 56 seconds.

(Melt Kneading)

In step (1), the resin material and plasticizer are melt kneaded with a twin-screw extruder to produce a resin composition. For the second embodiment, the conditions such as the type of apparatus used for melt kneading, and the time, are not restricted so long as homogeneity of swelling of the resin material with respect to the plasticizer is ensured. Optionally, a PO resin other than PE and PP, a resin material other than PO, a known additive such as a dehydrating condensation catalyst, a metal soap such as calcium stearate or zinc stearate, or an ultraviolet absorber, light stabilizer, antistatic agent, anti-fogging agent or color pigment, may also be loaded into the twin-screw extruder.

(Cooling-Solidification and Sheet Casting)

In step (1), the melt kneaded mixture is cast into a sheet. The method of producing the cast sheet may be, for example, a method of extruding the melt kneaded mixture through a T-die or the like into a sheet, and contacting it with a heat conductor to cool it to a sufficiently lower temperature than the crystallization temperature of the resin component, thereby solidifying it. The heat conductor used for cooling solidification may be a metal, water, air or a plasticizer. Metal rolls are preferably used for high heat conduction efficiency. When the extruded kneaded blend is to be contacted with metal rolls, it is more preferably sandwiched between at least a pair of rolls because this will further increase the heat conduction efficiency while causing the sheet to become oriented and increasing the membrane strength, and also tending to improve the surface smoothness of the sheet. The die lip gap when extruding the resin composition into a sheet from a T-die is preferably from 200 μm to 3,000 μm and more preferably from 500 μm to 2,500 μm. Limiting the die lip gap to 200 μm or greater can reduce tip adhesion, can lower the effects of streaks and defects on the film quality, and can lower the risk of film rupture during the subsequent stretching step. Limiting the die lip gap to 3,000 μm or smaller, on the other hand, can speed the cooling rate to prevent cooling irregularities while maintaining sheet thickness stability. The extruded cast sheet may also be subjected to rolling.

[Stretching Step (2)]

In step (2), the cast sheet obtained in step (1) is stretched to an area increase factor of 20 to 250. If the area increase factor is 20 or greater the obtained microporous membrane will tend to be imparted with sufficient strength, and if the area increase factor is 250 or lower, film rupture will tend to be prevented, resulting in high productivity. Step (2) may be carried out before the porous body forming step (3), or it may be carried out on the porous body after step (3). Step (2) may also be carried out before or after extraction of the plasticizer from the cast sheet.

The stretching treatment is preferably biaxial stretching rather than uniaxial stretching from the viewpoint of helping to lower the membrane thickness distribution and air permeability distribution in the transverse direction (TD). Simultaneously stretching the sheet in biaxial directions will reduce the cooling and heating frequency of the cast sheet during the film formation step, and will improve the distribution in the transverse direction. Examples of biaxial stretching methods include simultaneous biaxial stretching, sequential biaxial stretching, multistage stretching and repeated stretching. Simultaneous biaxial stretching is preferred from the viewpoint of obtaining increased puncture strength and stretching uniformity, while successive biaxial stretching is preferred from the viewpoint of easier control of the plane orientation.

For the purpose of the present specification, simultaneous biaxial stretching is a stretching method in which stretching in the MD (the machine direction during continuous casting of the microporous membrane) and stretching in the TD (the direction crossing the MD of the microporous membrane at a 90° angle) are carried out simultaneously, and in such a case the stretch ratios in each direction may be different. Sequential biaxial stretching is a stretching method in which stretching in the MD and TD are carried out independently, in such a manner that when the MD or TD stretching is being carried out, the other direction is in a non-constrained state or in an anchored state with fixed length.

The stretch ratio is an area increase by a factor of preferably in the range of 20 to 200, more preferably in the range of 25 to 170 and even more preferably in the range of 30 to 150. The stretch ratio in each axial direction is preferably in the range of 2 to 15 in the MD and 2 to 15 in the TD, more preferably in the range of 3 to 12 in the MD and 3 to 12 in the TD, and even more preferably in the range of 5 to 10 in the MD and 5 to 10 in the TD.

From the viewpoint of melting and film forming properties of the PE/PP starting material, the stretching temperature is preferably 90° C. to 150° C., more preferably 100° C. to 140° C. and even more preferably 110° C. to 130° C.

[Microporous Membrane Forming Step (3)]

In step (3), the plasticizer is extracted from the resin composition formed in step (1) or the stretched sheet formed in step (2), to form a microporous membrane. The method of extracting the plasticizer may be, for example, a method of immersing the stretched sheet in an extraction solvent to extract the plasticizer, and then drying it. The extraction method may be either a batch process or a continuous process. In order to minimize contraction of the microporous membrane, it is preferred to constrain the edges of the cast sheet during the series of steps of immersion and drying. The plasticizer residue in the microporous membrane is preferably less than 1 weight % of the total weight of the microporous membrane. The plasticizer may be collected by a process such as distillation after step (3) and reutilized.

The extraction solvent is preferably a poor solvent for the PE and PP resins and a good solvent for the plasticizer, and has a boiling point which is lower than the melting point of the PE and PP resins. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

[Heat Treatment Step (4)]

In step (4), the microporous membrane obtained in step (3) is subjected to heat treatment at a temperature below its melting point, and then the microporous membrane is stretched to produce a heat treated microporous membrane.

The microporous membrane is heat treated for heat setting from the viewpoint of inhibiting shrinkage. The method of heat treatment may include a stretching operation carried out with a predetermined atmosphere, a predetermined temperature and a predetermined stretch ratio to adjust the physical properties, and/or relaxation with a predetermined atmosphere, a predetermined temperature and a predetermined relaxation factor to reduce the stretching stress. The relaxation operation may also be carried out after the stretching operation. Such heat treatment can be carried out using a tenter or roll stretcher.

From the viewpoint of increasing the strength and porosity of the microporous membrane, the stretching operation is preferably stretching to a factor of 1.1 or greater and more preferably to a factor of 1.2 or greater in the MD and/or TD of the film. The upper limit for the stretch ratio during heat setting is preferably 3.0 or lower and more preferably 2.5 or lower, in both the MD and TD.

The relaxation is a contraction operation in the MD and/or TD of the membrane. The relaxation factor is the value of the dimension of the membrane after relaxation divided by the dimension of the membrane before the relaxation. When relaxation is in both the MD and TD, it is the value of the relaxation factor in the MD multiplied by the relaxation factor in the TD. The relaxation factor is preferably 0.99 or lower and more preferably 0.95 or lower. The relaxation factor is also preferably 0.5 or higher from the viewpoint of film quality. Relaxation may be in both the MD and TD, or in only either of the MD or TD.

The temperature for heat treatment including stretching and relaxation is preferably in the range of 100° C. to 170° C. from the viewpoint of the melting point (hereunder also referred to as "Tm") of the PE and PP resins. The temperature for stretching and relaxation is preferably within this range from the viewpoint of balance between heat shrinkage factor reduction and porosity. The lower limit for the heat treatment temperature is more preferably 110° C. or higher and even more preferably 115° C. or higher, and the upper limit is more preferably 160° C. or lower, even more preferably 150° C. or lower and yet more preferably 140° C. or lower.

[Winding Step (5)]

In step (5), the microporous membrane that has been heat treated in the heat treatment step (4) or the microporous membrane produced by the second embodiment, may be wound up into a roll using a winder. The obtained roll may be stored until use of the microporous membrane for production of a separator for a power storage device.

[Additional Steps]

From the viewpoint of handleability and storage stability, the obtained microporous membrane or roll may be cut with a slitter. The microporous membrane may also be subjected to post-treatment such as hydrophilicizing treatment with a surfactant, or crosslinking treatment with ionizing radiation. The microporous membrane obtained in steps (1) to (5) may be used as a single-layer separator, or a plurality of microporous membranes may be layered, the microporous membrane may be layered with another membrane, a functional layer may be formed on the microporous membrane, or the microporous membrane may be coated.

<Power Storage Device>

The power storage device according to another embodiment of the invention comprises a positive electrode, a negative electrode, and a separator comprising the microporous membrane described above. Specifically, the power storage device may be a lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium-air battery or zinc air battery, for example. Preferred among these, from the viewpoint of practicality, is a lithium secondary battery, lithium ion secondary battery (LIB), nickel hydrogen battery or lithium ion capacitor, with a lithium ion secondary battery being more preferred. The batteries mentioned above preferably include an electrolyte solution from the viewpoint of ionic conductivity and charge-discharge characteristics.

The electrolyte solution in the battery may include water, and water remaining in the system after battery fabrication, which may be water in the electrolyte solution or brought-in water included in the members such as the electrodes and separator. The electrolyte solution may also include a nonaqueous solvent. Examples of solvents included among nonaqueous solvents according to this embodiment include alcohols such as methanol and ethanol, and aprotic solvents. Aprotic solvents are preferred as nonaqueous solvents among these.

Examples of aprotic solvents include cyclic carbonates, fluoroethylene carbonates, lactones, sulfur atom-containing organic compounds, cyclic fluorinated carbonates, cyclic ethers, mononitriles, alkoxy group-substituted nitriles, dinitriles, cyclic nitriles, short chain fatty acid esters, chain ethers, fluorinated ethers, ketones, and compounds having all or some of the H atoms in the aprotic solvent substituted with halogen atoms.

Examples of cyclic carbonates include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate and vinylethylene carbonate.

Examples of fluoroethylene carbonates include 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one.

Examples of lactones include γ-butyrolactone, α-methyl-γ-butyrolactone, γ-valerolactone, γ-caprolactone, δ-valerolactone, δ-caprolactone and ε-caprolactone.

Examples of sulfur atom-containing organic compounds include ethylene sulfite, propylene sulfite, butylene sulfite, pentene sulfite, sulfolane, 3-sulfolene, 3-methylsulfolane, 1,3-propanesultone, 1,4-butanesultone, 1-propene-1,3-sultone, dimethyl sulfoxide, tetramethylene sulfoxide and ethylene glycol sulfite.

Examples of chain carbonates include ethyl methyl carbonate, dimethyl carbonate, diethyl carbonate, methyl propyl carbonate, methyl isopropyl carbonate, dipropyl carbonate, methyl butyl carbonate, dibutyl carbonate and ethyl propyl carbonate.

Examples of cyclic ethers include tetrahydrofuran, 2-methyltetrahydrofuran, 1,4-dioxane and 1,3-dioxane.

Examples of mononitriles include acetonitrile, propionitrile, butyronitrile, valeronitrile, benzonitrile and acrylonitrile.

Examples of alkoxy group-substituted nitriles include methoxyacetonitrile and 3-methoxypropionitrile.

Examples of dinitriles include malononitrile, succinonitrile, methylsuccinonitrile, glutaronitrile, 2-methylglutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, 2,4-dimethylglutaronitrile and ethylene glycol bis(propionitrile)ether.

An example of a cyclic nitrile is benzonitrile.

Examples of short chain fatty acid esters include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate and tert-butyl caproate.

Examples of chain ethers include dimethoxyethane, diethyl ether, 1,3-dioxolane, diglyme, triglyme and tetraglyme.

Examples of fluorinated ethers include compounds represented by the general formula $Rf_{aa}$-$OR_{bb}$ (where $Rf_{aa}$ is an alkyl group containing a fluorine atom and $R_{bb}$ is an organic group optionally containing a fluorine atom).

Examples of ketones include acetone, methyl ethyl ketone and methyl isobutyl ketone.

Examples of compounds in which all or some of the H atoms of an aprotic solvent have been substituted with halogen atoms include compounds where the halogen atom is fluorine.

Examples of fluorinated chain carbonates include methyltrifluoroethyl carbonate, trifluorodimethyl carbonate, trifluorodiethyl carbonate, trifluoroethylmethyl carbonate, methyl 2,2-difluoroethyl carbonate, methyl 2,2,2-trifluoroethyl carbonate and methyl 2,2,3,3-tetrafluoropropyl carbonate. A fluorinated chain carbonate can be represented by the following general formula:

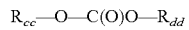

{where $R_{cc}$ and $R_{dd}$ are at least one selected from the group consisting of groups represented by $CH_3$, $CH_2CH_3$, $CH_2CH_2CH_3$, $CH(CH_3)_2$ and $CH_2Rf_{ee}$ (where $Rf_{ee}$ is an alkyl group of 1 to 3 carbon atoms with at least one hydrogen atom substituted with a fluorine atom, and $R_{cc}$ and/or $R_{dd}$ contain at least one fluorine atom}.

Examples of fluorinated short chain fatty acid esters include fluorinated short chain fatty acid esters, representative of which are 2,2-difluoroethyl acetate, 2,2,2-trifluoroethyl acetate and 2,2,3,3-tetrafluoropropyl acetate. Fluorinated short chain fatty acid esters can be represented by the following general formula:

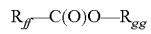

{where $R_{ff}$ is at least one selected from the group consisting of $CH_3$, $CH_2CH_3$, $CH_2CH_2CH_3$, $CH(CH_3)_2$, $CF_3CF_2H$, $CFH_2$, $CF_2H$, $CF_2Rf_{hh}$, $CFHRf_{hh}$ and $CH_2Rf_{ii}$, $R_{gg}$ is at least one selected from the group consisting of $CH_3$, $CH_2CH_3$, $CH_2CH_2CH_3$, $CH(CH_3)_2$ and $CH_2Rf_{ii}$, $Rf_{hh}$ is an alkyl group of 1 to 3 carbon atoms having at least one hydrogen atom substituted by a fluorine atom, $Rf_{ii}$ is an alkyl group of 1 to 3 carbon atoms having at least one hydrogen atom substituted with a fluorine atom, $R_{ff}$ and/or $R_{gg}$ contain at least one fluorine atom, and when $R_{ff}$ is $CF_2H$, $R_{gg}$ is not $CH_3$}.

<LIB>

An LIB is a battery employing a lithium transition metal oxide such as lithium cobaltate or a lithium-cobalt composite oxide as the positive electrode, a carbon material such as graphite, or a silicon-containing material as the negative electrode, and an organic solvent containing a lithium salt such as $LiPF_6$ as the electrolyte solution. During charge/discharge of an LIB, ionized Li reciprocates between the electrodes. The separator is disposed between the electrodes since the ionized Li must migrate between the electrodes relatively rapidly while contact between the electrodes is inhibited. From the viewpoint of closely bonding the separator of the first embodiment or the separator produced by the second embodiment to the negative electrode without gaps, the LIB negative electrode is preferably a silicon-containing negative electrode.

The values for the conditions, physical properties and characteristics explained above are those measured according to the methods described in the Examples, unless otherwise specified. When the separator includes one microporous membrane with another layer, or has a coating film, or includes a plurality of microporous membranes, the properties of the microporous membrane are measured or evaluated after either removing one microporous membrane from the separator, or after removing the coated part from the separator.

EXAMPLES

The present invention will now be explained in greater detail using examples and comparative examples. However, the invention is not limited only to the Examples so long as its gist is not exceeded. The physical properties in the Examples were measured by the following methods.

<Weight-Average Molecular Weight (Mw) and Number-Average Molecular Weight (Mn)>

Standard polystyrene was measured using a Model ALC/GPC 150C™ by Waters Co. under the following conditions, and a calibration curve was drawn. The chromatogram for each polymer was measured under the same conditions, and the weight-average molecular weight and number-average molecular weight of each polymer was calculated by the following method, based on the calibration curve.

Column: GMH₆-HT™ (2)+GMH₆-HTL™ (2), by Tosoh Corp.

Mobile phase: o-Dichlorobenzene

Detector: differential refractometer

Flow rate: 1.0 ml/min
Column temperature: 140° C.
Sample concentration: 0.1 wt %
(Weight-Average Molecular Weight and Number-Average Molecular Weight of Polyethylene and Polypropylene)

Each molecular weight component in the obtained calibration curve was multiplied by 0.43 (polyethylene Q factor/polystyrene Q factor=17.7/41.3) or 0.64 (polypropylene Q factor/polystyrene Q factor=26.4/41.3), to obtain a molecular weight distribution curve in terms of polyethylene or polypropylene, and the weight-average molecular weight and number-average molecular weight were calculated.

<mmmm Pentad Fraction in Stereoregular Structure>

The isotactic pentad fraction (mmmm) in the polypropylene component was determined as the (mmmm) peak fraction of the total absorption peaks in the methyl carbon region measured by $^{13}$C-NMR. Assignment of signals in the methyl group region including the isotactic pentad was made with reference to A. Zambelli et al. (Macromolecules 8, 687 (1975). Specifically, the mmmm pentad fraction for the stereoregular structure of PP in the starting materials and microporous membrane was measured in the following manner.

<mmmm Pentad Fraction for Stereoregular Structure of PP in Starting Materials and Microporous Membrane>

A sample was dissolved in o-dichlorobenzene-d4 at ≥130° C. to a 10 wt % concentration, and $^{13}$C-NMR measurement was carried out. The measuring conditions were as follows.

Apparatus: Bruker Avance NEO 600
Pulse program: zgpg30
Pulse delay time: 5 sec
Sample tube diameter: 5 mmφ
Measuring temperature: 130° C.

In the $^{13}$C-NMR spectrum, mmmm pentad was assigned to 21.8 ppm, and peaks in the methyl region of 18 ppm to 22 ppm were assigned as mmmm, mmmr, rmmr, mmrr, rmrr, rmrm, mmrm, rrrr, rrrm or mrrm. The integral value for mmmm pentad was divided by the sum of the integral values for these peaks, to calculate the mmmm pentad fraction. The chemical shift for each steric structure is:

mmmm 21.8 ppm,
mmmr 21.6 ppm,
rmmr 21.3 ppm,
mmrr 21.0 ppm,
mmrm+rmrr 20.8 ppm,
rmrm 20.6 ppm,
rrrr 20.3 ppm,
rrrm 20.2 ppm,
mrrm 19.9 ppm.

<Membrane Thickness (μm)>

A microthickness meter (type KBM by Toyo Seiki Co., Ltd.) was used to measure the thickness of a separator sample in an atmosphere of room temperature (23° C.) and 40% humidity. A terminal with a terminal diameter of 5 mmφ was used to apply a load of 44 gf.

<Porosity (%)>

A 10 cm×10 cm-square sample was cut out from the microporous membrane, and its volume (cm$^3$) and mass (g) were determined and used together with the density (g/cm$^3$) by the following formula, to obtain the porosity.

Porosity (%)=(Volume−mass/density)/volume×100

<Air Permeability (sec/100 cm$^3$)>

The air permeability of the polyolefin microporous membrane was measured by determining the air permeability resistance using a G-B2™ Gurley air permeability tester by Toyo Seiki Kogyo Co., Ltd. according to HS P-8117, in an environment of 23° C. temperature, 40% humidity.

<Crystal Structure Analysis>

Measurement of the crystallite sizes of the polyolefins (for example, PE and PP) in the separator or the microporous membrane of the separator may employ either reflection X-ray diffraction or transmission wide-angle X-ray scattering.

(Transmission Wide-Angle X-Ray Scattering)

Measurement of the crystallite sizes of the polyolefins (for example, PE and PP) in the separator or the microporous membrane of the separator was carried out using a NANOPIX transmission X-ray scattering apparatus by Rigaku Corp. The sample was irradiated with Cu-Kα rays and scattering was detected using a semiconductor detector Hypix-6000. Measurement was carried out under conditions with a sample/detector distance of 86 mm and an output of 40 kV, 30 mA. A point focus was used as the optical system, and the measurement was carried out with the following slit diameters: 1st slit: φ=0.55 mm, 2nd slit: open, guard slit: φ=0.35 mm.

Crystallite Size (nm) and Degree of Crystallinity by Transmission Wide-Angle X-Ray Scattering Analysis In the X-ray scattering pattern obtained with a 2D detector in transmission wide-angle X-ray scattering analysis, in which X-rays irradiated onto the sample propagate and are transmitted directly through it, the location where they reach the 2D detector is defined as the center, and scattering intensities at the same distance from the center correspond to identical scattering angles. By calculating the average intensity (circular average) at each scattering angle in the measured X-ray scattering pattern, it is possible to obtain a one-dimensional scattering intensity profile for scattering angle 2θ. The range from 2θ=10.0° to 2θ=29.0° in the obtained one-dimensional profile was processed for separation into 6 peaks: the polyethylene orthorhombic (110) plane diffraction peak, and orthorhombic (200) plane diffraction peak, polypropylene α crystal (110) plane diffraction peak, α crystal (040) plane diffraction peak, and α crystal (130) plane diffraction peak, and polyethylene amorphous peak. A baseline was drawn connecting 2θ=10.0° to 2θ=29.0° with a straight line, and the polyethylene (110) plane diffraction peak and (200) plane diffraction peak were approximated with a Voigt function while the polypropylene (110), (040) and (130) plane diffraction peaks and polyethylene amorphous peak were approximated with a Gaussian function. The location of the amorphous peak was 2θ=19.6° and the full width at half maximum was fixed at 6.3°, while the peak locations and full widths at half maximum of the crystalline peaks were separated without being fixed. The crystallite size was calculated according to the Scherrer equation (formula below), based on the full width at half maximum of the polyethylene (110) plane diffraction peak and polypropylene (110) plane diffraction peak, calculated by peak separation. The degree of crystallinity can be obtained as a percent value, dividing the area of the crystal peak by the sum of the separated crystal and amorphous peaks.

$D = K\lambda/(\beta \cos \theta)$

D: Crystallite size (nm)
K: 0.9 (Constant)
λ: X-ray wavelength (nm)
β: $(\beta_1^2 - \beta_2^2)^{0.5}$
$\beta_1$: Full width at half maximum of (hkl) peak calculated after peak separation (rad)
$\beta_2$: Full width at half maximum of incident beam (rad)
θ: Bragg angle (Reflection X-Ray Diffraction Analysis)
Polyolefin Crystallite Size (nm) and Degree of Crystallinity in Reflection X-Ray Diffraction Analysis The polyolefins (for example, PE and PP) in the separator were subjected to XRD measurement using an Ultima-IV X-ray diffraction analyzer by Rigaku Corp. Cu-Kα rays were directed onto the sample and the diffracted light was detected using a D/tex Ultra Detector by Rigaku Corp. KRD measurement was carried out under conditions with a sample/detector distance of 285 mm, an excitation voltage of 40 kV and a current of 40 mA. A centralized optic system was used as the optical system, and measurement was carried out under slit conditions of DS=½°, SS=release, and vertical slit=10 mm.

Analysis in Reflection X-Ray Diffraction
Polyethylene

The range from 2θ=9.7° to 2θ=29.0° in the obtained XRD profile was separated into three peaks: an orthorhombic (110) plane diffraction peak, an orthorhombic (200) plane diffraction peak and an amorphous peak, and the crystallite size was calculated according to the Scherrer equation (formula below), based on the full width at half maximum of the (110) plane diffraction peak. The (110) plane diffraction peak and the (200) plane diffraction peak were approximated by a Voigt function, and the amorphous peak was approximated by a Gaussian function. The location of the amorphous peak was 2θ=19.6° and the full width at half maximum was fixed at 6.3°, while the peak locations and full widths at half maximum of the crystalline peaks were separated without being fixed. The crystallite size was calculated according to the Scherrer equation (formula below), based on the full width at half maximum of the (110) plane diffraction peak calculated by peak separation. The degree of crystallinity can be obtained as a percent value, dividing the sum of the separated crystal and amorphous peaks by the area of the crystal peaks.

Polypropylene

In the range from 2θ=6° to 2θ=31° in the obtained XRD profile, the crystal-derived diffraction peak was separated into 5 planes: the a crystal (monoclinic) (110), (040), (130), (111) and (13-1)/(041) planes, and the amorphous-derived diffraction peak was separated into two. The separated crystal and amorphous diffraction peaks were approximated with a Gaussian function. The two amorphous peaks were fixed and separated as follows. Amorphous peak 1 was fixed at 2θ=14.9° and full width at half maximum of 4.7°, and amorphous peak 2 was fixed at 2θ=19.18° and full width at half maximum of 7.0°. The crystallite size was calculated according to the Scherrer equation (formula below), based on the full width at half maximum of the (110) plane diffraction peak obtained by peak separation. The degree of crystallinity can be obtained as a percent value, dividing the area of the crystal peaks by the sum of the separated crystal and amorphous peaks.

$D\ (110) = K\lambda/(\beta \cos \theta)$

D (110): Crystallite size (nm)
K: 0.9 (Constant)
λ: X-ray wavelength (nm)
$\beta: (\beta_1^2 - \beta_2^2)^{0.5}$
$\beta_1$: Full width at half maximum of (hkl) peak calculated after peak separation (rad)
$\beta_2$: Full width at half maximum of incident beam (rad)
θ: Bragg angle <Amount of Unmelted Materials in Separator (Count/1000 m²)>

The amount of unmelted materials in the separator was quantified by a region with an area of equal to or greater than 100 μm length×100 μm width, and with no light permeation, when separators obtained by the film formation steps in the Examples and Comparative Examples were observed with a transmission optical microscope. The number of resin aggregates per 1000 m² area of the separator were counted during observation with a transmission optical microscope.

<Cycle Test (%)—Test Method 1>

A positive electrode, negative electrode and nonaqueous electrolyte solution were prepared by the following procedure a. to c.

a. Fabrication of Positive Electrode

After mixing 90.4 weight % of a nickel, manganese and cobalt complex oxide (NMC) (Ni:Mn:Co=1:1:1 (element ratio), density: 4.70 g/cm³), as the positive electrode active material, 1.6 weight % of graphite powder (KS6) (density: 2.26 g/cm³, number-mean particle size: 6.5 μm) and 3.8 weight % of acetylene black powder (AB) (density: 1.95 g/cm³, number-mean particle size: 48 nm), as conductive aids, and 4.2 weight % of polyvinylidene fluoride (PVDF) (density: 1.75 g/cm³) as a binder, the mixture was dispersed in N-methylpyrrolidone (NMP) to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m².

b. Fabrication of Negative Electrode

Following the method described in NPL 3, a graphene negative electrode comprising 40% silicon was prepared and covered with a 12 μm-thick copper foil to a thickness of 3.6 μm as a negative electrode collector, to fabricate a negative electrode.

c. Preparation of Nonaqueous Electrolyte Solution

A nonaqueous electrolyte solution was prepared by dissolving 1.0 mol/L concentrated LiPF₆, as a solute, in a mixed solvent of ethylene carbonate:ethyl methyl carbonate=1:2 (volume ratio).

d. Fabrication of Battery

The method described in the <Membrane thickness (μm)> above was followed to measure the thickness of the microporous membrane used as the separator. The positive electrode, negative electrode and nonaqueous electrolyte solution obtained in the a. to c. above, and a separator (a separator of the Examples or a separator of the Comparative Examples) were used to fabricate a laminated secondary battery with a size of 100 mm×60 mm and a capacity of 3 Ah, which was charged with constant current, constant voltage (CCCV) over a period of 3 hours under conditions with a current value of 1 A (0.3 C) and a final cell voltage of 4.2 V.

e. Cycle Test, Thickness Retention (%) and Capacity Retention (%)

(e1) Pretreatment

The battery fabricated in the d. above was subjected to constant-current charge to a voltage of 4.2 V at a current value of ⅓ C, and then constant-voltage charge at 4.2 V for 8 hours, followed by discharge at a current of ⅓ C to a final voltage of 3.0 V. After then carrying out constant-current charge to a voltage of 4.2 V at a current value of 1 C, constant-voltage charge was carried out at 4.2 V for 3 hours, followed by discharge at a current of 1 C to a final voltage of 3.0 V. Finally, after carrying out constant-current charge to a voltage of 4.2 V at a current value of 1 C, constant-voltage charge was carried out at 4.2 V for 3 hours. The value of 1 C represents the current value at which the reference capacity of the battery is discharged for 1 hour.

(e2) Cycle Test

The battery pretreated in the (e1) above was discharged at a discharge current of 1 C to a final discharge voltage of 3 V at a temperature of 25° C., and then charged at a charging current of 1 C to a final charge voltage of 4.2 V. Charge-discharge was repeated with this procedure as 1 cycle. The capacity retention after 1000 cycles with respect to the initial capacity (capacity at the first cycle) was calculated as a percentage by the following formula.

Evaluation result (%)=100×(Retention capacity after 1000 cycles/initial capacity)

The separator was removed from the battery after 100 cycles, and the thickness was measured by the method described above under the <Membrane thickness (μm)>. The thickness retention of the separator after 100 cycles was calculated as a percentage by the following formula.

Evaluation results (%)=100×(Thickness of separator after 100 cycles/thickness of separator measured in the d. above)

The thickness of the removed separator was measured at 10 arbitrary locations and the average value was used.

<Cycle Test (%)—Test Method 2>

(Fabrication of Battery)

a. Fabrication of Positive Electrode

After mixing $LiNi_{1/3}Mn_{1/3}C_{1/3}O_2$ as the positive electrode active material, carbon black as a conductive aid and a polyvinylidene fluoride solution as a binder in a solid weight ratio of 91:5:4, N-methyl-2-pyrrolidone was added as a dispersion solvent to a solid content of 68 weight %, and the components were further mixed to prepare a slurry solution. The slurry solution was coated onto both sides of aluminum foil with a thickness of 15 μm, leaving a portion of the aluminum foil exposed, and then the solvent was dried off for a coating amount of 175 g/m² per side. It was then rolled with a roll press to a positive electrode mixture density of 2.8 g/cm³, and then a coated portion was cut to 30 mm×50 mm so that it included an aluminum foil-exposed section, to obtain a positive electrode.

b. Fabrication of Negative Electrode

Artificial graphite/silicon particles (Elkem, Silgrain e-Si 408)=1:1 (weight ratio) as a negative electrode active material, and an aqueous solution of styrene-butadiene rubber and carboxymethyl cellulose as a binder, were mixed in a solid weight ratio of negative electrode active material: styrene-butadiene rubber: carboxymethyl cellulose=96.4: 1.9:1.7, and then water was added as a dispersion solvent to a solid content of 50 weight % and the components were further mixed to prepare a slurry solution. The slurry solution was coated onto both sides of copper foil with a thickness of 10 μm, leaving a portion of the copper foil exposed, and then the solvent was dried off for a coating amount of 86 g/m² per side. It was then further rolled with a roll press to a negative electrode mixture density of 1.45 g/cm³, and then a coated portion was cut to 32 mm×52 mm so that it included a copper foil-exposed section, to obtain a negative electrode.

c. Preparation of Nonaqueous Electrolyte Solution

A nonaqueous electrolyte solution was prepared by dissolving 1.0 mol/L concentration of $LiPF_6$, as a solute, in a mixed solvent of ethylene carbonate:ethyl methyl carbonate=1:2 (volume ratio), and further adding vinylene carbonate to 1.0 wt %.

d. Battery Assembly

A long separator with a width of 55 mm was folded in between the positive electrode and negative electrode with the active material sides of the positive electrode and negative electrode facing each other, to form a laminated stack comprising 15 double-side coated negative electrodes and 14 double-side coated positive electrodes. Sealant-attached aluminum leads were welded onto the aluminum foil-exposed portions of the 14 positive electrodes of the laminated stack, sealant-attached nickel leads were welded onto the negative electrode copper foil-exposed portions of the 15 negative electrodes, and these were then inserted into an aluminum laminate exterior body and laminated sealing was carried out on the side where the positive and negative leads were exposed, and two other sides, for a total of 3 sides. The nonaqueous electrolyte solution was then injected into the exterior body and the opening was sealed, to fabricate a laminated battery with 28 facing layers. After allowing the fabricated battery to stand at room temperature for 1 day, the battery was subjected to initial charge for a total of 8 hours by a method of charging to a cell voltage of 4.2 V at constant current of 330 mA (0.3 C) in an atmosphere of 25° C. and, after reaching that voltage, constant-voltage charging while maintaining 4.2 V. The battery was then discharged to a cell voltage of 3.0 V at a current value of 330 mA (0.3 C).

(Cycle Characteristic Evaluation)

Charge-discharge of the battery obtained in "d. Battery assembly" was carried out for 1000 cycles in a 25° C. atmosphere. For charging, the battery was charged for a total of 3 hours by a method of charging to a cell voltage of 4.2 V at constant current of 1 A (1.0 C) and, after reaching that voltage, constant-voltage charging while maintaining 4.2 V. Discharge was carried out by discharging the battery to a cell voltage of 3.0 V at a current value of 1 A (1.0 C). The capacity retention was calculated from the service capacity at the 1000th cycle and the service capacity at the first cycle. A high capacity retention was evaluated as a satisfactory cycle characteristic.

Evaluation result (%)=100×(Retention capacity after 1000 cycles/initial capacity)

The separator was removed from the battery after 100 cycles, and the thickness was measured by the method described above under <Membrane thickness (μm)>. The thickness retention of the separator after 100 cycles was calculated as a percentage by the following formula.

Evaluation results (%)=100×(Thickness of separator after 100 cycles/thickness of separator measured in d.)

The thickness of the removed separator was measured at 10 arbitrary locations and the average value was used.

<Polyethylene (PE) Starting Material>

Polyethylene (PE) was prepared as shown in Table 1.

<Polypropylene (PP) Starting Material>

The polypropylene (PP) shown in Table 2 or Table 3 was prepared.

Example 1

PE1 powder and PP1 pellets were supplied to a twin-screw extruder provided with a 1500 μm die lip gap manifold (T-die) according to loading method (a), at the weight ratio listed in Table 4, and were melt mixed. During the melt mixing, liquid paraffin (kinematic viscosity of $7.59 \times 10^{-5}$ m²/s at 37.78° C.) was supplied to the twin-screw extruder through an injection nozzle, and the mixture was further kneaded to extrude the resin composition. During this time, liquid paraffin was further injected from the middle level of extrusion (the middle feed port of the twin-screw extruder) so that the liquid paraffin quantity ratio was 70 weight % of the resin composition extruded from the twin-screw extruder, and the temperature of the resin composition was 220° C. The extruded resin composition was then extruded and cast onto a cooling roll controlled to a surface temperature of 25° C., to obtain a cast sheet.

The cast sheet was then fed into a simultaneous biaxial tenter stretching machine for biaxial stretching, to obtain a stretched sheet. The stretching conditions were as shown in Table 4, with a stretching area increase factor of 55 and appropriate adjustment of the stretching temperature and heating air flow, to adjust the porosity, air permeability and thickness. The biaxial stretching temperature was set to 126° C.

The stretched sheet was then immersed in dichloromethane to extract the liquid paraffin from the stretched sheet, forming a microporous membrane.

It was then fed to a TD tenter for heat setting of the microporous membrane and subjected to heat setting (HS) at 129° C., stretched to a TD stretch ratio factor of 2.0, and then relaxed to a relaxation factor of 0.9 in the TD direction (i.e., stretching to 2.0 in the TD direction with respect to before heat setting was carried out, and thereafter, it was relaxed to 1.8). The heat treated microporous membrane was evaluated as described above. The microporous membrane was then used as a separator for separator evaluation and battery evaluation as described above. The evaluation results are shown in Table 4.

Examples 2 to 20 and Comparative Examples 1 to 3

Microporous membranes were fabricated and evaluated by the same method as Example 1, except that the starting material compositions, starting material loading methods or stretch ratios in the stretching step were changed as shown in Tables 4 to 6. The evaluation results for the obtained microporous membranes, separators and batteries are shown in Tables 4 to 6.

TABLE 1

| Polyethylene | | PE1 | PE2 | PE3 | PE4 |
|---|---|---|---|---|---|
| Weight-average molecular weight | Mw | 1,000,000 | 150,000 | 10,300,000 | 75,000 |
| Molecular weight distribution | Mw/Mn | 8.2 | 8.2 | 13 | 2.8 |
| Form | | Powder | Powder | Powder | Powder |
| Size/μm | $Nd_{50}$ | 120 | 135 | 110 | 120 |
| | $Nd_{80}/Nd_{20}$ | 1.2 | 3.7 | 2.5 | 2.7 |
| | $Vd_{50}$ | 135 | 165 | 155 | 180 |
| | $Vd_{80}/Vd_{20}$ | 1.3 | 3.1 | 2.1 | 2.3 |

TABLE 2

| Polypropylene | | PP1 | PP2 | PP3 | PP4 | PP5 | PP6 |
|---|---|---|---|---|---|---|---|
| Weight-average molecular weight | Mw | 830,000 | 1,100,000 | 310,000 | 1,800,000 | 200,000 | 2,200,000 |
| Molecular weight distribution | Mw/Mn | 4.5 | 10 | 5.5 | 5.7 | 2.8 | 13.5 |
| Mmmm fraction | mol % | 99.3 | 96 | 90 | 97 | 99.9 | 84 |
| Form | | Pellets | Pellets | Pellets | Pellets | Pellets | Pellets |
| Size/mm | Maximum side length | 5 | 6 | 2 | 3 | 5 | 4 |
| | Minimum side length | 4 | 2 | 1.2 | 2 | 3 | 3 |

TABLE 3

| Polypropylene | | PP7 |
|---|---|---|
| Weight-average molecular weight | Mw | 820,000 |
| Molecular weight distribution | Mw/Mn | 4.5 |
| mmmm fraction | mol % | 99.2 |
| Form | | Powder |

TABLE 3-continued

| Polypropylene | | PP7 |
|---|---|---|
| Size/μm | $Nd_{50}$ | 165 |
| | $Nd_{80}/Nd_{20}$ | 1.3 |
| | $Vd_{50}$ | 190 |
| | $Vd_{80}/Vd_{20}$ | 1.2 |

TABLE 4

| | | | | | Example | | | | |
|---|---|---|---|---|---|---|---|---|---|
| | | | | | 1 | 2 | 3 | 4 | 5 |
| Sheet-casting step | Starting material | PE | | Form | Powder | Powder | Powder | Powder | Powder |
| | | | | Type | PE1 | PE1 | PE1 | PE1 | PE1 |
| | | PP | | Form | Pellets | Pellets | Pellets | Pellets | Pellets |
| | | | | Weight ratio/wt % | 5 | 5 | 2 | 38 | 5 |
| | | | | Type | PP1 | PP1 | PP1 | PP1 | PP2 |
| | | Starting material loading method | | | (a) | (b) | (a) | (a) | (a) |
| Stretching step | | Stretch ratio | | MD/times | 7 | 7 | 7 | 7 | 7 |
| | | | | TD/times | 7 | 7 | 7 | 7 | 7 |
| Porous body-forming step | | Plasticizer extraction solvent type | | | Dichloromethane | | | | |
| Heat treatment step | | Stretching-relaxation rate | | | 2.0-1.8 | 2.0-1.8 | 2.0-1.8 | 2.0-1.8 | 2.0-1.8 |
| | | Treatment temperature | | | 129 | 128 | 128 | 129 | 127 |
| Microporous membrane | Basic properties | Membrane thickness | | μm | 12 | 12.2 | 11.2 | 9.4 | 10 |
| | | Porosity | | % | 50 | 49 | 35 | 33 | 48 |
| | | Air permeability | | sec | 150 | 150 | 153 | 98 | 110 |
| | Crystalline structure | XRD analysis results | PE crystallite size | nm | 21 | 20 | 28 | 26 | 27 |
| | | | PE crystallinity degree | % | 90 | 91 | 90 | 92 | 93 |
| | | | PP crystallite size | nm | 25 | 29 | 31 | 35 | 28 |
| | | WAXS analysis results | PE crystallite size | nm | 24 | 23 | 30 | 27 | 29 |
| | | | PE crystallinity degree | % | 70 | 71 | 70 | 72 | 75 |
| | | | PP crystallite size | nm | 29 | 33 | 35 | 39 | 33 |
| Separator evaluation | Test method 1 | Thickness retention after 100 cycles | | % | 98 | 98 | 97 | 97 | 95 |
| | | Capacity retention during 1000 cycles | | % | 95 | 94 | 93 | 92 | 89 |
| Battery evaluation | Test method 2 | Thickness retention after 100 cycles | | % | 98 | 97 | 97 | 95 | 96 |
| | | Capacity retention during 1000 cycles | | % | 93 | 93 | 90 | 90 | 81 |
| Separator production evaluation | | Unmelted material defects | | Count/1000 m² | 0 | 0 | 0 | 0 | 0 |

| | | | | | Example | | | | |
|---|---|---|---|---|---|---|---|---|---|
| | | | | | 6 | 7 | 8 | 9 | 10 |
| Sheet-casting step | Starting material | PE | | Form | Powder | Powder | Powder | Powder | Powder |
| | | | | Type | PE1 | PE1 | PE2 | PE1 | PE1 |
| | | PP | | Form | Pellets | Pellets | Pellets | Pellets | Pellets |
| | | | | Weight ratio/wt % | 5 | 5 | 5 | 5 | 5 |
| | | | | Type | PP3 | PP4 | PP1 | PP1 | PP1 |
| | | Starting material loading method | | | (a) | (a) | (a) | (a) | (a) |
| Stretching step | | Stretch ratio | | MD/times | 7 | 7 | 7 | 10 | 6 |
| | | | | TD/times | 7 | 7 | 7 | 10 | 6 |
| Porous body-forming step | | Plasticizer extraction solvent type | | | Dichloromethane | | | | |
| Heat treatment step | | Stretching-relaxation rate | | | 2.0-1.8 | 2.0-1.8 | 2.0-1.8 | 2.0-1.8 | 2.0-1.8 |
| | | Treatment temperature | | | 127 | 128 | 129 | 118 | 131 |
| Microporous membrane | Basic properties | Membrane thickness | | μm | 10 | 10.2 | 10.7 | 10 | 10.2 |
| | | Porosity | | % | 47 | 42 | 48 | 50 | 51 |
| | | Air permeability | | sec | 117 | 131 | 157 | 157 | 157 |
| | Crystalline structure | XRD analysis results | PE crystallite size | nm | 31 | 32 | 26 | 16 | 38 |
| | | | PE crystallinity degree | % | 94 | 89 | 93 | 99.7 | 81 |
| | | | PP crystallite size | nm | 21 | 24 | 29 | 11 | 12 |
| | | WAXS analysis results | PE crystallite size | nm | 31 | 33 | 27 | 17 | 38 |
| | | | PE crystallinity degree | % | 73 | 70 | 68 | 73 | 70 |
| | | | PP crystallite size | nm | 29 | 31 | 32 | 15 | 17 |

TABLE 4-continued

| | | | | | | | | |
|---|---|---|---|---|---|---|---|---|
| Separator evaluation | Test method 1 | Thickness retention after 100 cycles | % | 94 | 94 | 93 | 91 | 92 |
| | | Capacity retention during 1000 cycles | % | 88 | 89 | 87 | 82 | 84 |
| Battery evaluation | Test method 2 | Thickness retention after 100 cycles | % | 93 | 91 | 91 | 84 | 85 |
| | | Capacity retention during 1000 cycles | % | 82 | 80 | 81 | 73 | 76 |
| Separator production evaluation | | Unmelted material defects | Count/1000 m² | 0 | 0 | 0 | 2 | 5 |

TABLE 5

| | | | | | | Example | | | | | |
|---|---|---|---|---|---|---|---|---|---|---|---|
| | | | | | | 11 | 12 | 12 + 1 | 12 + 2 | 13 | 14 |
| Sheet-casting step | Starting material | | PE | | Form | Powder | Powder | Powder | Powder | Powder | Powder |
| | | | | | Type | PE1 | PE1 | PE1 | PE1 | PE1 | PE1 |
| | | | PP | | Form | Pellets | Pellets | Pellets | Pellets | Pellets | Pellets |
| | | | | | Weight ratio/wt % | 5 | 5 | 5 | 5 | 5 | 5 |
| | | | | | Type | PP1 | PP1 | PP1 | PP1 | PP6 | PP5 |
| | Starting material loading method | | | | | (a) | (a) | (a) | (a) | (a) | (a) |
| Stretching step | Stretch ratio | | | | MD/times | 10 | 5 | 5 | 4 | 7 | 7 |
| | | | | | TD/times | 10 | 6 | 9 | 4 | 7 | 7 |
| Porous body-forming step | Plasticizer extraction solvent type | | | | | Dichloromethane | | | | | |
| Heat treatment step | | | Stretching-relaxation rate | | | 2.0-1.8 | 2.0-1.8 | 3.0-2.8 | 1.3-1.1 | 2.0-1.8 | 2.0-1.8 |
| | | | Treatment temperature | | | 136 | 138 | 139 | 117 | 126 | 127 |
| Microporous membrane | Basic properties | | Membrane thickness | | μm | 11 | 10 | 9 | 13 | 10 | 10.2 |
| | | | Porosity | | % | 52 | 55 | 47 | 41 | 50 | 51 |
| | | | Air permeability | | sec | 185 | 177 | 210 | 270 | 203 | 252 |
| | Crystalline structure | XRD analysis results | PE crystallite size | | nm | 16 | 37 | 18 | 38 | 26 | 31 |
| | | | PE crystallinity degree | | % | 99.8 | 82 | 99.9 | 78 | 92 | 91 |
| | | | PP crystallite size | | nm | 47 | 45 | 26 | 41 | 7 | 52 |
| | | WAXS analysis results | PE crystallite size | | nm | 18 | 37 | 22 | 40 | 27 | 32 |
| | | | PE crystallinity degree | | % | 75 | 65 | 85 | 56 | 68 | 65 |
| | | | PP crystallite size | | nm | 48 | 47 | 49 | 43 | 9 | 55 |
| Separator evaluation | Test method 1 | Thickness retention after 100 cycles | | | % | 89 | 93 | 85 | 86 | 70 | 68 |
| | | Capacity retention during 1000 cycles | | | % | 84 | 81 | 70 | 72 | 24 | 30 |
| Battery evaluation | Test method 2 | Thickness retention after 100 cycles | | | % | 83 | 82 | 79 | 77 | 70 | 71 |
| | | Capacity retention during 1000 cycles | | | % | 72 | 75 | 63 | 65 | 20 | 18 |
| Separator production evaluation | | Unmelted material defects | | | Count/1000 m² | 3 | 4 | 2 | 1 | 7 | 9 |

| | | | | | | Example | | | | | |
|---|---|---|---|---|---|---|---|---|---|---|---|
| | | | | | | 15 | 16 | 17 | 18 | 19 | 20 |
| Sheet-casting step | Starting material | | PE | | Form | Powder | Powder | Powder | Powder | Powder | Powder |
| | | | | | Type | PE3 | PE4 | PE3 | PE4 | PE3 | PE4 |
| | | | PP | | Form | Pellets | Pellets | Pellets | Pellets | Pellets | Pellets |
| | | | | | Weight ratio/wt % | 5 | 5 | 5 | 5 | 5 | 5 |
| | | | | | Type | PP1 | PP1 | PP6 | PP6 | PP5 | PP5 |
| | Starting material loading method | | | | | (a) | (a) | (a) | (a) | (a) | (a) |
| Stretching step | Stretch ratio | | | | MD/times | 7 | 7 | 7 | 7 | 7 | 7 |
| | | | | | TD/times | 7 | 7 | 7 | 7 | 7 | 7 |
| Porous body-forming step | Plasticizer extraction solvent type | | | | | Dichloromethane | | | | | |
| Heat treatment step | | | Stretching-relaxation rate | | | 2.0-1.8 | 2.0-1.8 | 2.0-1.8 | 2.0-1.8 | 2.0-1.8 | 2.0-1.8 |
| | | | Treatment temperature | | | 121 | 128 | 128 | 129 | 127 | 125 |
| Microporous membrane | Basic properties | | Membrane thickness | | μm | 10.5 | 10.5 | 11 | 11.2 | 11.5 | 12 |
| | | | Porosity | | % | 49 | 51 | 57 | 45 | 43 | 57 |
| | | | Air permeability | | sec | 127 | 106 | 168 | 175 | 121 | 198 |
| | Crystalline structure | XRD analysis results | PE crystallite size | | nm | 11 | 43 | 11 | 43 | 11 | 43 |
| | | | PE crystallinity degree | | % | 97 | 83 | 95 | 82 | 97 | 81 |
| | | | PP crystallite size | | nm | 25 | 38 | 6 | 7 | 55 | 51 |
| | | WAXS analysis results | PE crystallite size | | nm | 13 | 44 | 10 | 45 | 12 | 46 |
| | | | PE crystallinity degree | | % | 78 | 63 | 76 | 62 | 78 | 63 |
| | | | PP crystallite size | | nm | 32 | 47 | 8 | 7 | 65 | 67 |

TABLE 5-continued

| Separator evaluation | Test method 1 | Thickness retention after 100 cycles | % | 65 | 64 | 60 | 62 | 63 | 58 |
|---|---|---|---|---|---|---|---|---|---|
| | | Capacity retention during 1000 cycles | % | 28 | 34 | 10 | 9 | 11 | 13 |
| Battery evaluation | Test method 2 | Thickness retention after 100 cycles | % | 67 | 66 | 58 | 57 | 62 | 54 |
| | | Capacity retention during 1000 cycles | % | 19 | 21 | 7 | 5 | 5 | 3 |
| Separator production evaluation | | Unmelted material defects | Count/1000 m² | 8 | 7 | 14 | 21 | 32 | 12 |

TABLE 6

| | | | | | Comparative Example 1 | Comparative Example 2 | Comparative Example 3 |
|---|---|---|---|---|---|---|---|
| Sheet-casting step | Starting material | PE | | Form | Powder | Powder | Powder |
| | | | | Type | PE1 | PE1 | PE1 |
| | | PP | | Form | Powder | Powder | Powder |
| | | | | Weight ratio/wt % | 5 | 5 | 5 |
| | | | | Type | PP7 | PP7 | PP7 |
| | | Starting material loading method | | | (a) | (b) | (c) |
| Stretching step | | Stretch ratio | | MD/times | 7 | 7 | 7 |
| | | | | TD/times | 7 | 7 | 7 |
| Porous body-forming step | | Plasticizer extraction solvent type | | | Dichloromethane | Dichloromethane | Dichloromethane |
| Heat treatment step | | Stretching-relaxation rate | | | 2.0-1.8 | 2.0-1.8 | 2.0-1.8 |
| | | Treatment temperature | | | 129 | 129 | 129 |
| Microporous membrane | Basic properties | Membrane thickness | | μm | 12 | 12.2 | 10 |
| | | Porosity | | % | 52 | 51 | 55 |
| | | Air permeability | | sec | 78 | 88 | 98 |
| | Crystalline structure | XRD analysis results | PE crystallite size | nm | 43 | 45 | 46 |
| | | | PE crystallinity degree | % | 65 | 61 | 66 |
| | | | PP crystallite size | nm | 70 | 75 | 73 |
| | | WAXS analysis results | PE crystallite size | nm | 45 | 46 | 46 |
| | | | PE crystallinity degree | % | 55 | 51 | 54 |
| | | | PP crystallite size | nm | 81 | 80 | 79 |
| Separator evaluation | Test method 1 | Thickness retention after 100 cycles | | % | 50 | 50 | 48 |
| | | Capacity retention during 1000 cycles | | % | 2 | 3 | 5 |
| Battery evaluation | Test method 2 | Thickness retention after 100 cycles | | % | 48 | 47 | 43 |
| | | Capacity retention during 1000 cycles | | % | 3 | 2 | 2 |
| Separator production evaluation | | Unmelted material defects | | Count/1000 m² | 354 | 688 | 778 |

(Explanation of Symbols in Tables 4 to 6).

Starting material loading method (a): PE and PP were loaded into the extruder from separate feeders.

Starting material loading method (b): A dry blend of PE and PP was loaded into the extruder from a single feeder.

Starting material loading method (c): A plurality of resin materials were obtained by dry blending PE and PP, and the plurality of resin materials were loaded into the extruder from separate feeders.

The invention claimed is:

1. A method for producing a separator for a power storage device comprising the following steps:
   (1) a sheet casting step in which polypropylene, polyethylene and a plasticizer are mixed and extruded into a sheet using an extruder, cooled to solidification, and processed into a cast sheet;
   (2) a stretching step in which the cast sheet is stretched to an area increase factor of 20 to 250 to form a stretched sheet;
   (3) a microporous membrane forming step in which the plasticizer is extracted from the stretched sheet to form a microporous membrane;
   (4) a heat treatment step in which the microporous membrane is subjected to heat treatment, and stretching and relaxation in the transverse direction to obtain a heat treated microporous membrane; and
   (5) a winding step in which the heat treated microporous membrane is wound up,
   wherein the polyethylene is in powder form and the polypropylene is in pellet form, wherein the polypropylene has a weight-average molecular weight (Mw) of 300,000 to 2,000,000, a ratio (Mw/Mn) of the weight-average molecular weight (Mw) to number-average molecular weight (Mn) is 3 to 12, and an isotactic pentad fraction (mmmm) of the polypropylene is 85.0 mol % to 99.7 mol %.

2. The method for producing a separator for a power storage device according to claim 1, wherein:
   the polypropylene and polyethylene are loaded into the extruder by any one of the following methods (a) to (c):
   (a) a method of loading the polypropylene and polyethylene into the extruder using separate feeders;
   (b) a method of loading the polypropylene and polyethylene into the extruder in a dry blended state using one feeder; or
   (c) a method of loading a plurality of resin materials obtained by dry blending the polypropylene and polyethylene, into the extruder using separate feeders.

3. The method for producing a separator for a power storage device according to claim 1, wherein the polyethylene/polypropylene weight ratio is 99/1 to 60/40.

4. The method for producing a separator for a power storage device according to claim 3, wherein the polyethylene has a weight-average molecular weight (Mw) of 100,000 to 9,700,000, and the ratio (Mw/Mn) of the weight-average molecular weight (Mw) to number-average molecular weight (Mn) is 3 to 12.

5. A separator for a power storage device produced by the production method according to claim 1.

6. A separator for a power storage device produced by the production method according to claim 2.

7. The separator for a power storage device according to claim 6, wherein:
- the separator for a power storage device comprises a microporous membrane,
- the microporous membrane comprises polyethylene and polypropylene, and
- in X-ray diffraction (XRD) or wide-angle X-ray scattering (WAXS) analysis of the microporous membrane, the crystallite size of the polyethylene is 15 nm to 40 nm and the crystallite size of the polypropylene is 10 nm to 50 nm.

8. A battery comprising the separator for a power storage device according to claim 6.

* * * * *